Jan. 14, 1936.　　C. C. WEISBROD　　2,027,659
CLUTCH STRUCTURE
Filed May 1, 1933
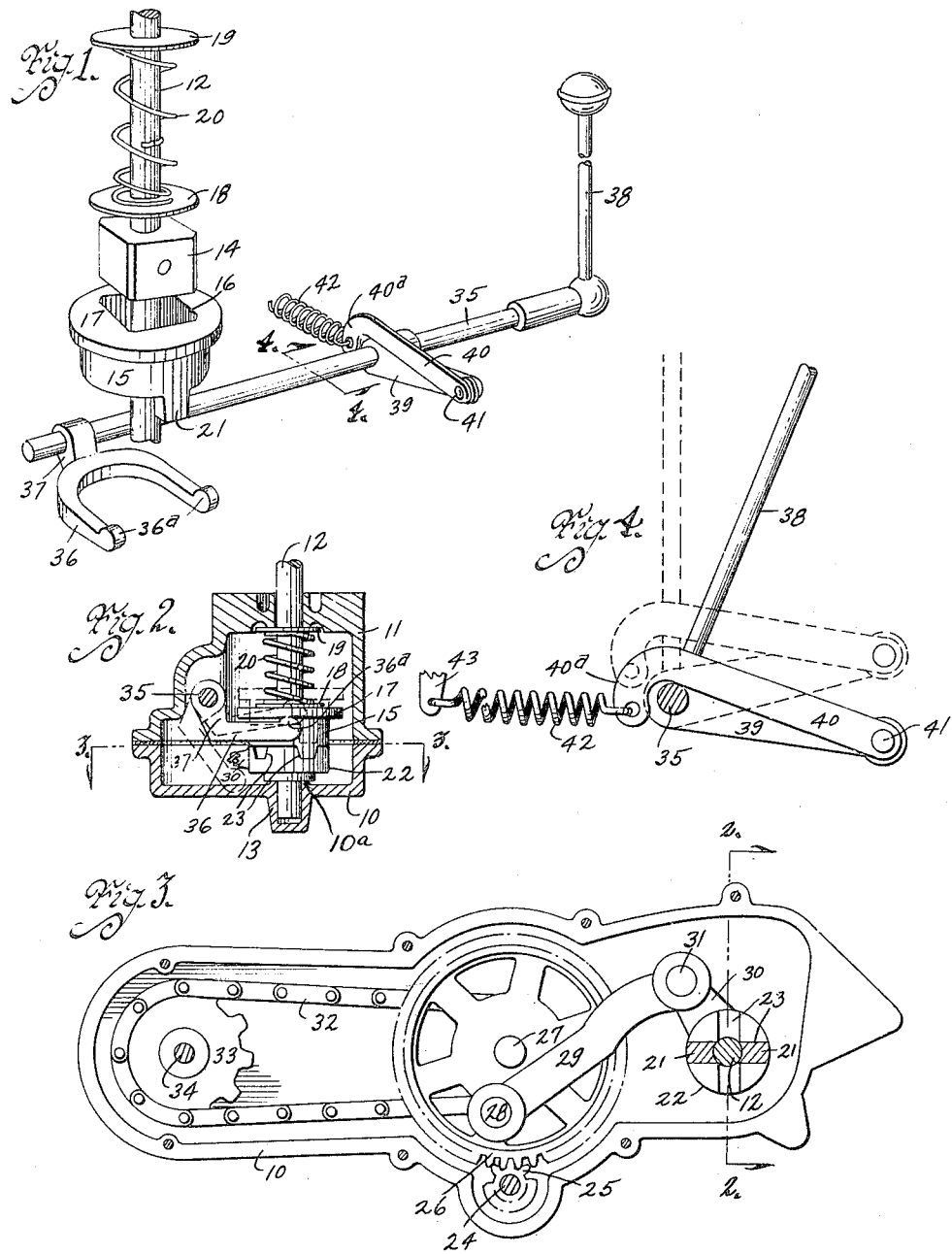
Inventor
Carl C. Weisbrod
by Bair, Freeman & Sinclair
Attorneys
Witness
Edw. Seeley Patented Jan. 14, 1936

2,027,659

UNITED STATES PATENT OFFICE 2,027,659

CLUTCH STRUCTURE

Carl C. Weisbrod, Newton, Iowa, assignor to One Minute Washer Company, Newton, Iowa, a corporation Application May 1, 1933, Serial No. 668,761

3 Claims. (Cl. 192—67)

The object of my invention is to provide a clutch structure, which may be used in a variety of environments for transmitting power and is particularly adapted for use in washing machines.

More particularly, it is my object to provide a clutch structure of very simple, durable and inexpensive construction, whereby power may be transmitted from one shaft to another and the transmission of power may be easily and readily controlled.

With these and other objects in view, my invention consists in the construction, arrangement and combination of the various parts of my clutch structure, whereby the objects contemplated are attained, as hereinafter more fully set forth, pointed out in my claims, and illustrated in the accompanying drawing, in which:

Figure 1 is a perspective view of parts of my clutch structure, some of the parts being separated to illustrate their relations.

Figure 2 is a vertical, sectional view of the assembled parts with the casing therefor, taken on the line 2—2 of Figure 3.

Figure 3 is a horizontal, sectional view taken on the line 3—3 of Figure 2; and

Figure 4 is a detailed, sectional view taken on the line 4—4 of Figure 1.

My improved clutch structure is illustrated as used in connection with the operating mechanism of a washing machine, but, of course, it can be used in other environments.

In the accompanying drawing, I have shown a gear casing made of a lower half, indicated by the reference numeral 10, and a separable upper half indicated by the reference numeral 11.

Arranged substantially spaced between the ends of the gear casing is an upright shaft 12, which may be the agitator drive shaft of a washing machine. The lower end of the shaft 12 is journaled in a bearing 13 formed in the lower gear casing member 10. The shaft projects upwardly through the top of the gear casing member 11.

On the shaft within the gear casing is fixed an angular block 14. A collar 15 has an angular socket 16 in which the block 14 is slidably received.

The collar 15 preferably has at its upper part the annular flange 17 upon which normally rests a washer 18. Another washer 19 is arranged adjacent the under side of the top of the gear casing member 11 and a spring 20 bearing against the washers 19 and 18 tends to yieldingly press the collar 15 downwardly.

The collar 15 forms a clutch member with the downwardly projecting clutch fingers 21.

Loosely mounted on the shaft 12 below the clutch collar 15 is a clutch collar 22 which has in its upper face the clutch notches 23. The lower face of the clutch collar 22 rests on the raised smooth face of the lower gear case 10, indicated at 10a in Figure 2.

A drive shaft 24 projects into the lower part of the casing 10 and has a pinion 25. The pinion 25 meshes with a pinion 26 on an upright counter shaft 27. The pinion 26 has an upwardly extending off-center pin 28 to which is pivoted an operating link 29.

Projecting from the clutch collar 22 is an arm 30, which is pivoted at 31 to the link 29.

The shaft 27 may be connected by suitable gearing 32—33 with a wringer operating shaft 34.

It will be seen from the foregoing that when the clutch collar 15 is in operative engagement with the clutch collar 22 and when rotation of the shaft 24 imparts rotation to the pinion 26, the rotation of the pinion 26 will impart reciprocating rotary motion to the shaft 12.

For lifting the clutch collar 15 away from engagement with the clutch collar 22, I have provided the following means:

An operating rod 35 projects through the wall of the upper gear case member 11 (see Figure 2). A U-shaped yoke 36 has a projecting arm 37 fixed on the rod 35. On the outer end of the rod 35 is an operating handle 38. When the handle 38 is moved to one position, the yoke 36 stands in its full line position shown in Figure 2. When it is desired to dis-engage the clutch members, the handle 38 is rocked for raising the yoke from its full line position shown in Figure 2 to its upper dotted line position shown in that figure. This causes the ends of the arms of the yoke, which are provided with the curved raised faces 36a, shown in Figure 1, to engage the under surface of the flange 17 and raise the clutch collar 15 against the tension of the spring 20 until the fingers 21 entirely clear the clutch collar 22.

I have provided an over-center spring structure, which tends to hold the yoke 36 either in its full line position of Figure 2 or its upper dotted line position of Figure 2, depending upon the position to which the arm 38 has been moved. This mechanism is shown in Figures 1 and 4.

On the rod 35 is an arm 39 which when the yoke 36 is in its full line horizontal position illustrated in Figure 2 extends away from the rod 35 in generally the same direction as the extension of the yoke 36 and slightly downwardly as illustrated in Figure 4.

An L-shaped link 40 has one end pivoted as at 41 to the projecting end of the arm 39 and has the L-shaped end 40a down-turned over the rod 35. A coil spring 42 is secured to the L-shaped end 40a and to a bracket 43 fixedly supported.

When the parts are in the full line position shown in Figure 4 and the yoke 36 is in full line position shown in Figure 2, the spring tends to hold the arm 39 down because its point of attachment to the L-shaped member 40a and the pivot 41 are below the axis of the rod 35.

Yet the fact that the link 40 extends above the rod 35 limits the downward movement of the arm 39.

Similarly when the handle 38 is moved from full line position shown in Figure 4 to dotted line position shown in that Figure for rocking the rod 35 for lifting the yoke 36 from its full line position shown in Figure 2 to its upper dotted line position shown in Figure 4, the arm 39 and link 40 move to their dotted line positions shown in Figure 4, and thereupon the spring 42 tends to hold the arm 39, link 40 and yoke 36 in their raised position for holding the clutch members out of engagement.

The arrangement is such as to facilitate the assembly and dis-assembly of the parts. For instance the washers 18 and 19 and spring 20 can be assembled on the shaft 12 as shown in Figure 1, and the shaft 12 can then be inserted through the hole in the casing member 11, and thereupon the clutch collar 15 can be slipped into place.

In the meanwhile, the yoke 36 will have been in the position shown by the lower dotted lines in Figure 2.

Then the yoke can be raised to its full line position shown in Figure 2 and the lower gear case member 10 with the parts received therein can be installed in position, sliding the collar 22 upon the shaft 12 and causing the end of the shaft 12 to project into the socket 13.

The construction shown provides a strong and rigid support for the shafts and parts illustrated and provides a simple and effective clutch structure.

Changes may be made in the construction and arrangement of the parts and in the kinds of materials used, and it is my intention to cover by my claims any modifications in structure, materials and arrangement, which may be reasonably included within their scope.

I claim as my invention:

1. In a structure of the class described, a gear casing comprising upper and lower members, a shaft journaled in the lower member and projecting through the upper member, an angular block fixed on the shaft within the casing, a clutch member having an angular hole slidably receiving the block, and provided with an annular flange, a clutch member rotatable on the shaft below the first clutch member held by the lower gear casing member against downward movement, washers on the shaft adjacent to the under side of the top of the casing and the upper face of the flange, a coil spring between the washers tending to hold the clutch members in engagement, a rod journaled in the upper gear casing member, a yoke fixed on the rod, with its arms receiving the first clutch member below the flange thereon and adapted to lift the first clutch member out of engagement with the second clutch member when the rod is rocked, and an over center spring device for holding the rod in either of two positions to which it may be rocked.

2. In a structure of the kind described, a shaft, a clutch member slidable but non-rotatable thereon, a clutch member rotatable on the shaft, a rock shaft, means on the rock shaft for cooperating with the first clutch member for moving it to inoperative position, and over-center spring means for holding the rock shaft in either of two positions to which it may be rocked, comprising an arm fixed to the shaft, a link pivoted to the outer end of the arm and having an L portion, extending over the rock shaft, and a spring secured to the lower end of the L portion, and to a fixed support, so as to swing over-center when the rock shaft is moved from one to the other of its said positions.

3. In a structure of the kind described, a pair of coacting separable gear case members, one having an opening for an upright shaft and another opening for a spaced, horizontal shaft, a shaft projecting through the first opening having a clutch member slidable but non-rotatable thereon, provided with an annular flange, means for yieldingly pressing said clutch member in one direction, a coacting clutch member on said shaft, a shaft projecting through the second opening having an associated yoke for engaging said flange when the second shaft is rotated for moving the first clutch member against the pressure of the yielding means, the other gear case member having means for receiving the first shaft and for engaging the second clutch member, and means for imparting motion to the second clutch member, the casing members being of such size as to permit the yoke arms to drop low enough to clear the flange during the assembly of the parts.

CARL C. WEISBROD.